(12) United States Patent
Hirayama et al.

(10) Patent No.: US 8,883,327 B2
(45) Date of Patent: Nov. 11, 2014

(54) MICROWAVE ASSISTED MAGNETIC RECORDING MEDIUM AND INFORMATION RECORDING APPARATUS USING THE SAME

(71) Applicant: Hitachi, Ltd., Tokyo (JP)

(72) Inventors: Yoshiyuki Hirayama, Kokubunji (JP); Masukazu Igarashi, Kawagoe (JP); Katsuro Watanabe, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 13/798,349

(22) Filed: Mar. 13, 2013

(65) Prior Publication Data

US 2013/0293983 A1    Nov. 7, 2013

(30) Foreign Application Priority Data

May 2, 2012 (JP) .................................. 2012-105035

(51) Int. Cl.
| | |
|---|---|
| *G11B 5/66* | (2006.01) |
| *G11B 5/74* | (2006.01) |
| *G11B 5/65* | (2006.01) |
| *G11B 5/64* | (2006.01) |
| *G11B 5/02* | (2006.01) |
| *G11B 5/68* | (2006.01) |
| *G11B 5/718* | (2006.01) |
| *G11B 5/00* | (2006.01) |

(52) U.S. Cl.
CPC *G11B 5/68* (2013.01); *G11B 5/746* (2013.01); *G11B 2005/0024* (2013.01); *G11B 5/66* (2013.01); *G11B 5/65* (2013.01); *G11B 5/64* (2013.01); *G11B 5/02* (2013.01); *G11B 5/718* (2013.01)
USPC ............................ 428/830; 428/829; 360/131

(58) Field of Classification Search
None
See application file for complete search history.

(56) References Cited

U.S. PATENT DOCUMENTS

| | | | |
|---|---|---|---|
| 6,541,116 B2 * | 4/2003 | Michal et al. | ................. 428/420 |
| 7,616,412 B2 | 11/2009 | Zhu et al. | |
| 7,813,071 B2 * | 10/2010 | Akagi et al. | ..................... 360/59 |
| 8,119,263 B2 * | 2/2012 | Nolan et al. | .................. 428/829 |
| 8,760,806 B2 * | 6/2014 | Igarashi et al. | ............ 360/125.3 |
| 2004/0166372 A1 * | 8/2004 | Haginoya et al. | .......... 428/694 T |
| 2006/0040140 A1 * | 2/2006 | Kaizu et al. | .................... 428/829 |

(Continued)

OTHER PUBLICATIONS

Wo 2009/133786 (2009 publication).*

(Continued)

*Primary Examiner* — Kevin Bernatz
(74) *Attorney, Agent, or Firm* — Antonelli, Terry, Stout & Kraus, LLP.

(57) ABSTRACT

Provided is a magnetic recording medium achieving both of reduction in switching field distribution and reduction in switching field intensity by high-frequency magnetic field, thus enabling high-density recording. Magnetic grains of the magnetic recording medium are made up of a recording layer and a resonance layer. The resonance layer is disposed closer to a protective layer 5 than the recording layer, and a magnetic material of the recording layer has anisotropy field 1.2 times or more anisotropy field of a magnetic material of the resonance layer. The magnetic material of the recording layer has saturation magnetization substantially equal to saturation magnetization of the magnetic material of the resonance layer. At the entire resonance layer and a part of the recording layer, the magnetic grains are separated from surrounding magnetic grains by a nonmagnetic material, and at a part of the recording layer, the magnetic grains are coupled with surrounding magnetic grains.

14 Claims, 6 Drawing Sheets

(56) References Cited

U.S. PATENT DOCUMENTS

| | | |
|---|---|---|
| 2008/0144213 A1* | 6/2008 | Berger et al. ............... 360/110 |
| 2011/0043943 A1 | 2/2011 | Igarashi et al. |
| 2012/0026626 A1* | 2/2012 | Nolan et al. ............... 360/135 |

OTHER PUBLICATIONS

Naoki Honda et al., Recording Simulation of Patterned Media Toward 2 Tb/in$^2$, IEEE Transactions on Magnetics, Jun. 2007, pp. 2142-2144, vol. 43, No. 6.

* cited by examiner

Exchange coupling between recording layer and resonance layer (erg/cm$^2$)

MICROWAVE ASSISTED MAGNETIC RECORDING MEDIUM AND INFORMATION RECORDING APPARATUS USING THE SAME

The present application claims priority from Japanese patent application JP 2012-105035 filed on May 2, 2012, the content of which is hereby incorporated by reference into this application.

BACKGROUND OF THE INVENTION

1. Field of the Invention

The present invention relates to a magnetic recording medium and an information recording apparatus configured to record information using a function of assisting magnetization switching of magnetic grains by irradiating a magnetic recording medium with a high-frequency magnetic field (hereinafter this may be referred to as micro wave).

2. Background Art

For higher recording density of magnetic recording, a recording bit size has to be reduced. Then, in order to stably maintain the magnetization of small recording bits, the recording medium has to be made of a magnetic material having high anisotropy field (or with high magnetic coercive force). Recording on such a magnetic recording medium having high anisotropy field will require intense recording magnetic field corresponding thereto. Since it is difficult to intensify the magnetic field for recording by a recording head, recording may fail due to the shortage of the magnetic field. To solve such a problem, methods such as microwave assisted magnetic recording and thermally assisted magnetic recording have been studied. These are methods of temporarily reducing the anisotropy field of the magnetic recording medium by irradiating it with high-frequency magnetic field or heat, thus enabling recording on a magnetic recording medium having high anisotropy field.

For microwave assisted magnetic recording, a magnetic recording medium was irradiated with high-frequency magnetic field of a microwave band, thus exciting precession of spin in magnetic material by using magnetic resonance effect and reducing magnetization switching field, and records information on the magnetic recording medium. For magnetic resonance, the temperature of the magnetic recording medium does not rise probably since selected spins are excited although microwaves at a frequency proportional to the anisotropy field of the magnetic recording medium have to be used.

U.S. Pat. No. 7,616,412 discloses a technique for microwave assisted recording, and according to this technique, a magnetized rotating body rotating rapidly due to spin torque is disposed for generation of high-frequency magnetic field in the vicinity of a magnetic recording medium that is adjacent to a main pole of a perpendicular magnetic head. WO2009/133786 discloses a technique for a microwave assisted magnetic recording medium, including a magnetic (resonance) layer on a surface side of the magnetic recording medium and a recording layer on a substrate side, the resonance layer being induced by high-frequency magnetic field and the recording layer having larger anisotropy field and being switched following the resonance layer.

For higher recording density, the size of recording bits has to be made smaller, and in order to record information on such small recording bits precisely, the distribution of magnetic field (magnetic switching field) that is necessary for magnetization switching of magnetic grains making up the magnetic recording medium has to be made smaller. In the case of large switching field distribution, not only specific intended magnetic grains but also a part of surrounding magnetic gains will be switched by the recording magnetic field of a head. A known method to reduce the switching field distribution is to introduce suitable exchange coupling between neighboring magnetic grains. For instance, IEEE TRANSACTIONS ON MAGNETICS, vol. 43, No. 6, 2142 (2007) describes suppressed switching field distribution by introducing exchange coupling between dots of a bit-patterned medium.

As a result of further study to reduce switching field distribution for microwave assisted recording, however, it was found that the exchange coupling given between magnetic grains of the magnetic recording medium often causes a failure to record information precisely on small recording bits in the microwave assisted recording. Even in case of the small switching field distribution in terms of static magnetic properties, this is not always reflected in the recording characteristics of microwave assisted recording. It is necessary for microwave assisted recording to reduce the switching field by applying high-frequency magnetic field, which is different from conventional recording methods. Thus, in order to realize high density recording by recording information on small recording bits in microwave assisted recording, both of reduction in switching field distribution and reduction in switching field intensity by high-frequency magnetic field have to be achieved.

SUMMARY OF THE INVENTION

It is an object of the present invention to provide a microwave assisted magnetic recording medium and an information recording apparatus using the same, enabling high-density recording by achieving both of reduction in switching field distribution and reduction in switching field intensity by high-frequency magnetic field.

Further investigations on the relationships among magnetic properties, structures and recording properties of magnetic grains making up a microwave assisted magnetic recording medium, it was found that information can be recorded precisely on small recording bits by configuring the magnetic gains of the magnetic recording medium with at least two layers including a resonance layer and a recording layer, the resonance layer and the recording layer having the following magnetic properties and structures. The resonance layer is configured to have a value of anisotropy field of the magnetic material so as to resonate with high-frequency magnetic field generated from a microwave assisted magnetic recording head and to suppress exchange coupling between magnetic grains. Such magnetic property and structure greatly rotate spins of the magnetic material of the resonance layer while resonating with high-frequency magnetic field material from the microwave assisted magnetic recording head, thus exerting the effect of assisting magnetization switching of the recording layer. Since the resonance layer has to receive high-frequency magnetic field generated from the microwave assisted magnetic recording head effectively, the resonance layer has to be located closer to the surface of the magnetic recording medium than the recording layer. The recording layer is configured to have a large value of anisotropy field of the magnetic material so as not to resonate with high-frequency magnetic field generated from the microwave assisted magnetic recording head and to receive exchange coupling between magnetic grains adequately. The thus selected magnetic property and structure enable selective magnetization switching of the intended magnetic grains only.

It was further found that when saturation magnetization is different between the magnetic material of the resonance layer and the magnetic material of the recording layer, the medium becomes relatively stable in the state where the orientation of the magnetization is not aligned between the resonance layer and the recording layer, and thus the effect of assisting magnetization switching of magnetic gains in the recording layer by the resonance layer decreases. Then, in order to record information on smaller recording bits precisely, saturation magnetization has to be made substantially equal between the magnetic material of the resonance layer and the magnetic material of the recording layer. Such a difference in saturation magnetization less than 5% does not affect the assisting effect adversely. This is because a slight difference in saturation magnetization will not affect than the influences from the film thickness distribution of the resonance layer and the recording layer and the influence from the orientation distribution.

That is, a microwave assisted magnetic recording medium is configured so that magnetic grains are made up of at least two different layers of a recording layer and a resonance layer having different magnitude of anisotropy field. The resonance layer is disposed closer to the surface side than the recording layer. A magnetic material of the recording layer has anisotropy field 1.2 times or more anisotropy field of a magnetic material of the resonance layer. The magnetic material of the recording layer has saturation magnetization substantially equal to saturation magnetization of the magnetic material of the resonance layer. At the entire resonance layer and a part of the recording layer, the magnetic grains are separated from surrounding magnetic grains by a nonmagnetic material, and at a part of the recording layer, the magnetic grains are coupled with surrounding magnetic grains. With this configuration, the aforementioned problems can be solved.

More preferably, the magnetic recording medium further includes an exchange coupling adjustment layer between the recording layer and the resonance layer, and exchange coupling between the recording layer and the resonance layer is 0.75 erg/cm$^2$ or more. Preferably, the magnetic grains are aligned regularly.

In the configuration of including FePt alloy as a main component of the magnetic grains, the FePt alloy of the recording layer may have a substantially same composition as the FePt alloy of the resonance layer, and a degree of order S1 of the FePt alloy of the recording layer and a degree of order S2 of the FePt alloy of the resonance layer may hold the relationship of $(S1-0.4)/(S2-0.4) \geq 1.2$. With this configuration, a microwave assisted magnetic recording medium enabling high-density recording can be provided. A difference in Fe composition between the recording layer and the resonance layer less than 5% does not adversely affect the assist effect, thus enabling high-density recording.

In the configuration of including CoPt alloy as a main component of the magnetic grains, the CoPt alloy of the recording layer may have a substantially same composition as the CoPt alloy of the resonance layer, and a degree of order S1 of the CoPt alloy of the recording layer and a degree of order S2 of the CoPt alloy of the resonance layer may hold the relationship of $(S1-0.4)/(S2-0.4) \geq 1.2$. With this configuration, a microwave assisted magnetic recording medium enabling high-density recording can be provided. A difference in Co composition between the recording layer and the resonance layer less than 5% does not adversely affect the assist effect, thus enabling high-density recording.

In the configuration of including CoPtCr alloy as a main component of the magnetic grains, the CoPtCr alloy of the recording layer may have a Co concentration that is substantially same as a Co concentration of the CoPtCr alloy of the resonance layer, and the CoPtCr alloy of the recording layer may have a Pt concentration 12 times or more a Pt concentration of the CoPtCr alloy of the resonance layer. With this configuration, a microwave assisted magnetic recording medium enabling high-density recording can be provided. A difference in Co composition between the recording layer and the resonance layer less than 5% does not adversely affect the assist effect, thus enabling high-density recording.

Using the thus configured microwave assisted magnetic recording medium and a magnetic head provided with a high-frequency magnetic field oscillation element, a magnetic pole generating recording magnetic field and a magnetic reproduction element that reads magnetic information, an information recording apparatus enabling high-density recording can be provided.

Effects of the Invention

Information can be precisely recorded on a microwave assisted magnetic recording medium of the present invention using a microwave assisted recording head, and an information recording apparatus having recording density exceeding 2 T bit per 1 square inch can be realized.

Problems, configurations, and effects other than those described above will be made clear by the following description of embodiments.

DESCRIPTION OF A PREFERRED EMBODIMENT OF THE INVENTION

The following describes examples of a microwave assisted magnetic recording medium and an information, recording apparatus of the invention with reference to the drawings.

Example 1

A magnetic recording medium of the present example was manufactured by a sputtering apparatus. This sputtering apparatus was made up of a plurality of process chambers and one substrate loading chamber, and air was evacuated from the chambers individually. After evacuation of all process chambers to the degree of vacuum of $1\times10^{-5}$ Pa or lower, a carrier carrying a substrate is moved along the process chambers and sputtering was performed one by one. A process chamber for sputtering was provided with a rotating-magnet type magnetron sputter cathode, and a metal film and a carbon film were formed by DC sputtering, and an oxide film was formed by RF sputtering. A process chamber for heating was provided with a lamp heater, and the substrate temperature was controlled by regulating the supplied electricity. The substrate temperature was checked with a radiation thermometer.

Figure 1:
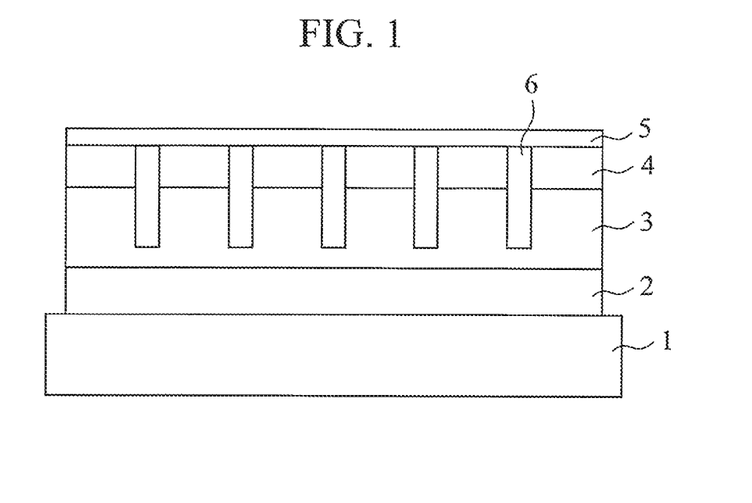
FIG. 1 schematically shows a cross-sectional structure of an exemplary magnetic recording medium of the present invention.

FIG. 1 schematically shows a cross-sectional structure of a magnetic recording medium of the present example. The following describes the procedure to manufacture the magnetic recording medium.

A substrate 1 used was a heat-resistant glass substrate of 0.8 mm in thickness and 65 mm in diameter. Firstly, a primer layer 2 was formed on the substrate. That is, a Ni-37.5 at % Ta alloy film of 30 nm in thickness was formed as an adhesion layer, and then a MgO film of 10 nm in thickness was formed as an orientation control layer. Subsequently, electricity of 1,900 W was supplied to the lamp heater for 14 seconds for heating. The achieving temperature of the substrate at this time was about 650° C. Next, a film as a recording layer 3 including Fe-50 at % Pt alloy, to which 15 vol % of $SiO_2$ was added, was formed to be a thickness of 3 nm, followed by formation of a film including Fe-50 at % Pt alloy, to which 30 vol % of carbon was added, to be a thickness of 5 nm. Then, after checking the substrate temperature decreasing to 450° C., a film as a resonance layer 4 including Fe-50 at % Pt alloy, to which 30 vol % of carbon was added, was formed to be a thickness of 3 nm. Then, a carbon film of 2.6 nm in thickness was formed as a protective layer 5 on the resonance layer 4. The film thicknesses of these layers were average thicknesses, which were adjusted by sputtering duration and supplied electricity. Argon gas was used as sputtering gas. After forming the carbon protective layer, the medium was taken out from the chamber, and organic lubricant was applied to the surface to form a lubricant layer.

Structures of the recording layer 3 and the resonance layer 4 were observed with a transmission electron microscope. The observation showed that $SiO_2$ did not segregate at the grain boundary and crystal grains linked continuously in case of the $SiO_2$ added FePt alloy film. On the other hand, in case of the carbon added FePt alloy film, showing a so-called granular structure where each FePt alloy crystal grain was isolated. That is, the FePt alloy magnetic grains were configured to link between adjacent grains at the lower part of the recording layer and to be isolated by nonmagnetic grain boundaries 6 at the upper part of the recording layer and the resonance layer. FIG. 1 schematically shows the cross-sectional structure of the magnetic recording medium of the present example that was observed with the transmission electron microscope.

Magnetic properties of the FePt alloy film were measured with a vibrating sample magnetometer. The saturation magnetization of each layer was about 700 emu/cm$^3$. The anisotropy field of the recording layer was 65 kOe and that of the resonance layer was 23 kOe.

FePt alloy manufactured at high temperatures generates a $L1_0$ ordered phase. The degree of order of the $L1_0$ ordered phase can be found from the ratio between diffraction intensity from FePt (001) plane and diffraction intensity from FePt (002) plane, which are obtained by X-ray diffraction measurement. When crystal orientation is favorable, the square root of the value obtained by dividing the ratio of diffraction intensity by 2.04 shows the degree of order. Measuring the degree of order for the magnetic recording medium of the present example, that of the recording layer was 0.85 and that of resonance layer was 0.56.

Using a spin stand tester and a microwave assisted magnetic recording head, signals were written on the magnetic recording medium of the present example. At this time, the microwave assisted magnetic recording head was selected carefully so that the magnetic material of the resonance layer in the magnetic recording medium resonates with the high-frequency magnetic field generated from the microwave assisted magnetic recording head. Since the reduced output of the written signals was sufficiently large, it was found that signals were recorded on the recording layer without problems. It was further found that information was written at recording density of 2 T bits per 1 square inch.

Comparative Example 1-1

Figure 2:
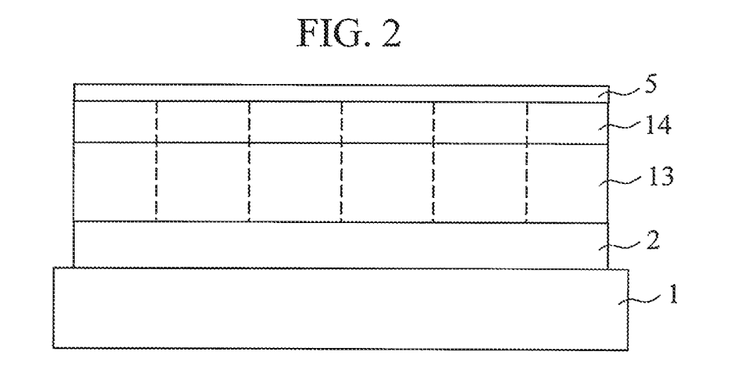
FIG. 2 schematically shows a cross-sectional structure of a magnetic recording medium that is a comparative example.

FIG. 2 schematically shows a cross-sectional structure of a magnetic recording medium of this comparative example.

The magnetic recording medium of this comparative example was manufactured by the procedure similar to Example 1. This comparative example was different from Example 1 only in materials of the recording layer and the resonance layer. A recording layer 13 was formed with Fe-50 at % Pt alloy, to which 15 vol % of $SiO_2$ was added. The recording layer had a thickness of 8 nm that was the same as Example 1. A resonance layer 14 was also formed with Fe-50 at % Pt alloy, to which 15 vol % of $SiO_2$ was added.

Structures of the recording layer 13 and the resonance layer 14 were observed with a transmission electron microscope. The observation showed that $SiO_2$ did not segregate at the grain boundary, and crystal grains linked continuously, and magnetic grains linked between adjacent grains at the recording layer 13 and the resonance layer 14 as a whole in case of the $SiO_2$ added FePt alloy film. FIG. 2 schematically shows the cross-sectional structure of the magnetic recording medium of this comparative example that was observed with the transmission electron microscope. The FePt alloy had substantially the same magnetic properties and the degree of order as those of Example 1.

Using a spin stand tester and a microwave assisted magnetic recording head, signals were written on the magnetic recording medium of this comparative example. Then, substantially no reproduced output of the signals was obtained. It was found that information could not be written on the recording layer.

Presumably, since magnetic grains of the resonance layer 14 linked with surrounding magnetic grains due to exchange coupling, spins of the magnetic material at the resonance layer could not rotate enough in response to the high-frequency magnetic field generated from the microwave assisted magnetic recording head, thus failing to reduce the switching field.

Comparative Example 1-2

Figure 3:
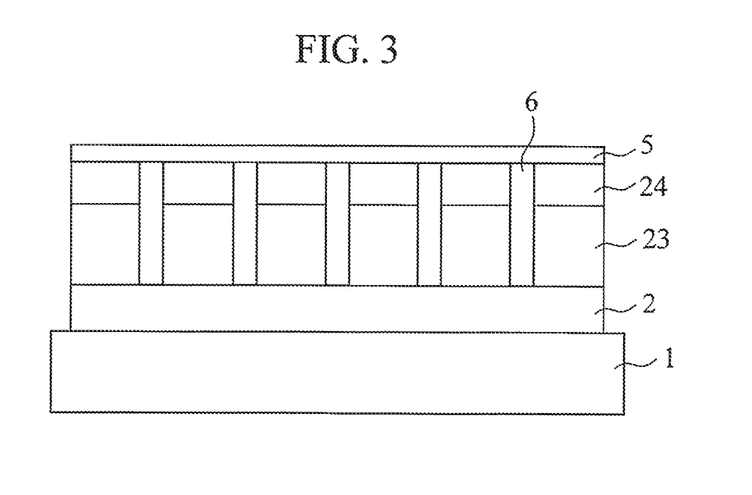
FIG. 3 schematically shows a cross-sectional structure of a magnetic recording medium that is another comparative example.

FIG. 3 schematically shows a cross-sectional structure of a magnetic recording medium of this comparative example.

The magnetic recording medium of this comparative example was manufactured by the procedure similar to Example 1. This comparative example was different from Example 1 only in a material of the recording layer. A recording layer 23 as a whole was a film including Fe-50 at % Pt alloy, to which 30 vol % of carbon was added. The recording layer 23 had a thickness of 8 nm that was the same as Example 1. A resonance layer 24 was formed on the recording layer 23 similarly to Example 1.

Structures of the recording layer 23 and the resonance layer 24 were observed with a transmission electron microscope. The observation showed that in the carbon added FePt alloy film, carbon segregated at the grain boundary, showing a so-called granular structure where each FePt alloy crystal grain was isolated at the entire of the recording layer 23 and the resonance layer 24. FIG. 3 schematically shows the cross-sectional structure of the magnetic recording medium of this comparative example that was observed with the transmission electron microscope. The FePt alloy had substantially the same magnetic properties and the degree of order as those of Example 1.

Using a spin stand tester and a microwave assisted magnetic recording head, signals were written on the magnetic recording medium of this comparative example. Then, reproduced output of the signals was decreased by 12% than that of Example 1. Noise was large, and compared with Example 1, the SN ratio was lower by 3 dB. Although signals were written on the recording layer 23, the signal quality was poor. Presumably such poor signal quality results from large switching field distribution of the magnetic recording medium. Due to the low SN ratio, information could not be written at recording density of 2 T bits per 1 square inch.

Comparative Example 1-3

Magnetic recording media were manufactured by the procedure similar to Example 1. This comparative example was different from Example 1 only in that, instead of Fe-50 at % Pt alloy, Fe-45 at % Pt-10 at % Ag alloy and Fe-40 at % Pt-20 at % Ag alloy were used for the resonance layer.

Although the minute structure of the recording layer and the resonance layer was exactly the same as Example 1, saturation magnetization and anisotropy field of the FePt alloy magnetic grains were different from Example 1. That is, the saturation magnetization of the recording layer was 700 emu/cm$^3$, and that of the resonance layer was 610 emu/cm$^3$ for the Fe-45 at % Pt-10 at % Ag alloy and 520 emu/cm$^3$ for the Fe-40 at % Pt-20 at % Ag alloy. The anisotropy field of the recording layer was 65 kOe and that of the resonance layer was 22 kOe.

Using a spin stand tester and a microwave assisted magnetic recording head, signals were written on the magnetic recording media of this comparative example. Then, no reproduced output of the signals was obtained from both of the magnetic recording media. It was found that information could not be written on the recording layers.

When saturation magnetization is different between the magnetic material of the resonance layer and the magnetic material of the recording layer, the medium becomes relatively stable in the state where the orientation of the magnetization is not aligned between the resonance layer and the recording layer. Thus, the effect of assisting magnetization switching of magnetic grains in the recording layer by the resonance layer probably decreases. It is desirable that saturation magnetization is as equal as possible between the magnetic material of the resonance layer and the magnetic material of the recording layer, and a difference therebetween of 5% or more actually leads to a noticeable influence therefrom. A slight difference in saturation magnetization will not affect than the influences from the film thickness distribution of the resonance layer and the recording layer and the influence from the orientation distribution.

Comparative Example 1-4

Magnetic recording media were manufactured by the procedure similar to Example 1. This comparative example was different from Example 1 only in that, instead of Fe-50 at % Pt alloy, Fe-45 at % Pt-20 at % Ag alloy and Fe-40 at % Pt-20 at % Ag alloy were used for the recording layer.

Although the minute structure of the recording layer and the resonance layer was exactly same as Example 1, saturation magnetization and anisotropy field of the FePt alloy magnetic grains were different from Example 1. That is, the saturation magnetization, of the recording layer was 610 emu/cm$^3$ for the Fe-45 at % Pt-10 at % Ag alloy and 520 emu/cm$^3$ for the Fe-40 at % Pt-20 at % Ag alloy, and that of the resonance layer was 700 emu/cm$^3$. The anisotropy field of the recording layer was 63 kOe and that of the resonance layer was 23 kOe.

Using a spin stand tester and a recording head for microwave assigned recording, signals were written on the magnetic recording media of this comparative example. Then, no reproduced output of the signals was obtained from both of the magnetic recording media. It was found that information could not be written on the recording layers.

When saturation magnetization is different between the magnetic material of the resonance layer and the magnetic material of the recording layer, the medium becomes relatively stable in the state where the orientation of the magnetization is not aligned between the resonance layer and the recording layer. Thus, the effect of assisting magnetization switching of magnetic grains in the recording layer by the resonance layer probably decreases. It is desirable that saturation magnetization is as equal as possible between the magnetic material of the resonance layer and the magnetic material of the recording layer, and a difference therebetween of 5% or more actually leads to a noticeable influence therefrom.

Example 2

A magnetic recording medium was manufactured by the procedure similar to Example 1. This example was different from Example 1 only in that a temperature to form the recording layer and a temperature to form the resonance layer. Eight magnetic recording media were manufactured while setting the temperatures variously. The temperature to form the recording layer was changed by changing the heating duration, and the temperature to form the resonance layer was changed by changing the waiting duration. Such a change in temperature to form the recording layer and the resonance layer changes the degree of order of FePt alloy.

Structures of the recording layers and the resonance layers were observed with a transmission electron microscope. The observation showed that all magnetic recording media of the present example had the same structure as Example 1. That is, the FePt alloy magnetic grains were configured to link between adjacent grains at the lower part of the recording layer and to be isolated at the upper part of the recording layer and the resonance layer.

Magnetic properties of the FePt alloy were measured with a vibrating sample magnetometer. Saturation magnetization of the recording layers and the resonance layers in all of the magnetic recording media was about 700 emu/cm$^3$. On the other hand, each magnetic recording medium showed different anisotropy field and different degree of order of FePt alloy.

Using a spin stand tester and a microwave assisted magnetic recording head, signals were written on the magnetic recording media of the present example. At this time, the microwave assisted magnetic recording head was selected carefully so that the magnetic material of the resonance layer in the magnetic recording medium resonates with the high frequency magnetic field generated from the microwave assisted magnetic recording head. Since the reproduced output of the written signals was sufficiently large, it was found that signals were recorded on the recording layers without problems. It was further found that information was written at recording density of 2 T bits per 1 square inch.

Figure 4:
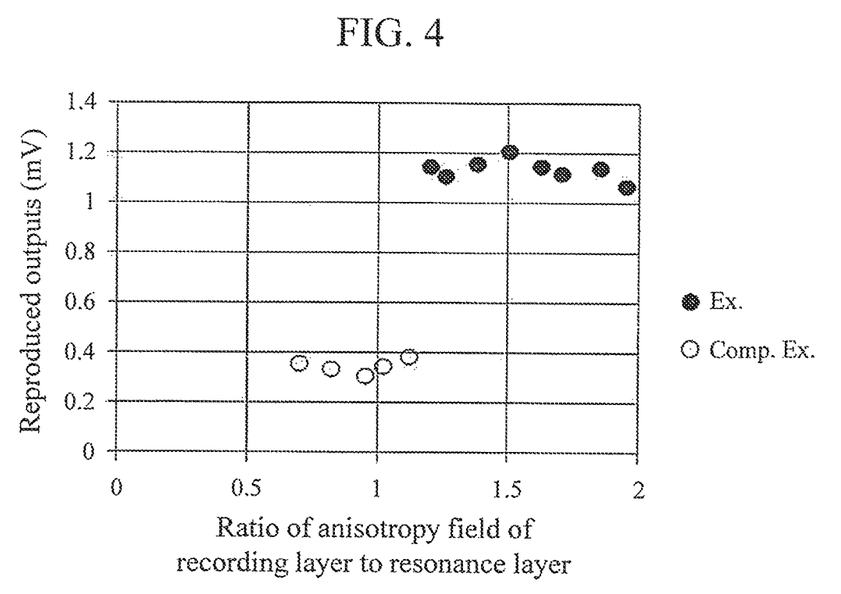
FIG. 4 is a graph showing the relationship between the ratio of the anisotropy field of the recording layer to the anisotropy field of the resonance layer and the reproduced outputs of signals.

FIG. 4 is a graph where the reproduced outputs of signals are plotted with reference to the ratio of the anisotropy field of the recording layer to the anisotropy field of the resonance layer. Filled circles show properties of the magnetic recording media of the present example. This result shows that a magnetic recording medium having anisotropy field of the magnetic material of the recording layer 1.2 times or more anisotropy field of the magnetic material of the resonance layer generates sufficiently large reproduced output of written signals, meaning a sufficient effect of microwave assist. Media as comparative examples in the drawing will be described later.

Figure 5:
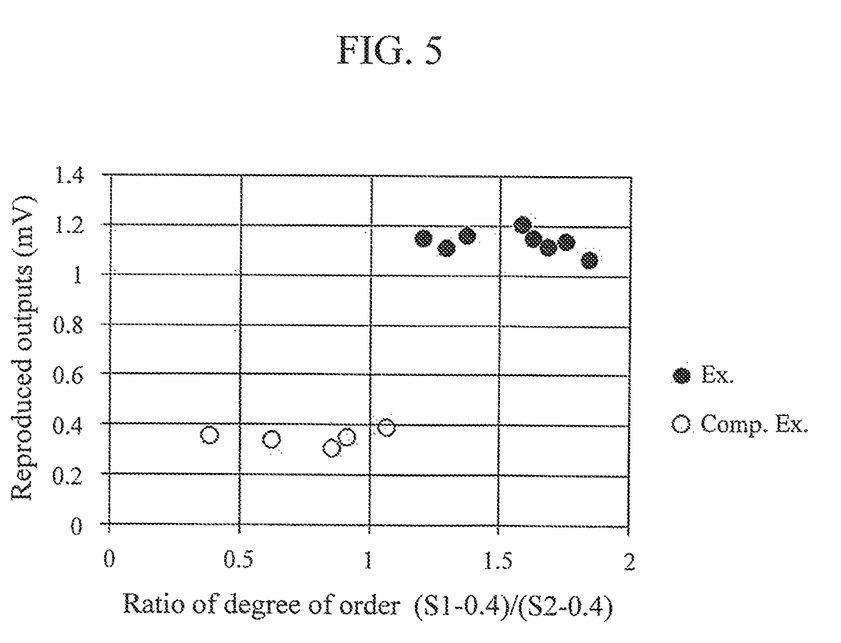
FIG. 5 is a graph showing the relationship between the reproduced outputs of signals and the degree of order of FePt alloy.

FIG. 5 is a graph where the reproduced outputs of signals are plotted with reference to the degree of order of FePt alloy. Filled circles show the magnetic recording media of the present example. The degree of order of FePt alloy is shown by setting the degree of order of Fat alloy of the recording layer as S1 and the degree of order of FePt alloy of the resonance layer as S2, and organizing the results by (S1−0.4)/(S2−0.4) as a parameter. This parameter is created based on the fact that, letting S denotes the degree of order, S−0.4 is substantially proportional to the anisotropy field. The result shows that sufficiently large reproduced output of written signals, meaning a sufficient effect of microwave assist can be obtained when the relationship of (S1−0.4)/(S2−0.4)≥1.2 holds between the degree of order S1 of the FePt alloy of the recording layer and the degree of order S2 of the FePt alloy of the resonance layer. Media as comparative examples in the drawing will be described later.

CoPt alloy used instead of the FePt alloy of the present example showed the exactly same tendency. That is, sufficiently large reproduced output of written signals, meaning a sufficient effect of microwave assist can be obtained when the relationship of (S1−0.4)/(S2−0.4)≥1.2 holds between the degree of order S1 of the CoPt alloy of the recording layer and the degree of order S2 of the CoPt alloy of the resonance layer. It was also found that information was written at recording density of 2 T bits per 1 square inch.

A similar effect of microwave assist was obtained from the FePt alloy or the CoPt alloy of the present example, to which additive elements such as Ni, Cu or Ag was added, as long as the recording layer and the resonance layer had substantially the same saturation magnetization and the anisotropy field of the magnetic material of the recording layer was 1.2 times or more the anisotropy field of the magnetic material of the resonance layer, thus enabling high-density recording.

Comparative Example 2

A magnetic recording medium was manufactured by the procedure similar to Example 2. This example was different from Example 2 only in that a temperature to for the recording layer and a temperature to form the resonance layer. Five magnetic recording media were manufactured while setting the temperatures variously. Structures of the recording layer and the resonance layer and their saturation magnetization were exactly the same as those of Example 2.

Blank circles of FIG. 4 show properties of the magnetic recording media of this comparative example about the ratio of anisotropy field. This result shows that a magnetic recording medium having anisotropy field of the magnetic material of the recording layer less than 1.2 times the anisotropy field of the magnetic material of the resonance layer shows difficulty in writing due to insufficient effect of microwave assist, thus reducing reproduced output greatly. In the case where the anisotropy field of the magnetic material of the recording layer is close to the anisotropy field of the magnetic material of the resonance layer, although magnetic material of the recording layer starts resonance by high-frequency magnetic field generated from the microwave assisted magnetic recording head, rotation of spins does not become large enough due to the exchange coupling with the surrounding magnetic grains, so that magnetization switching does not occur probably. A magnetic layer generating resonance is required to be magnetically isolated from the surrounding magnetic grains.

Blank circles of FIG. 5 show properties of the magnetic recording media of this comparative example about the ratio of the degree of order between the recording layer and the resonance layer. This result shows that a magnetic recording medium having a relationship of (S1−0.4)/(S2−0.4)<1.2 for the degree of order S1 of FePt alloy of the recording layer and the degree of order S2 of FePt alloy of the resonance layer shows difficulty in writing due to insufficient effect of microwave assist, thus reducing reproduced output greatly.

Example 3

Figure 6:
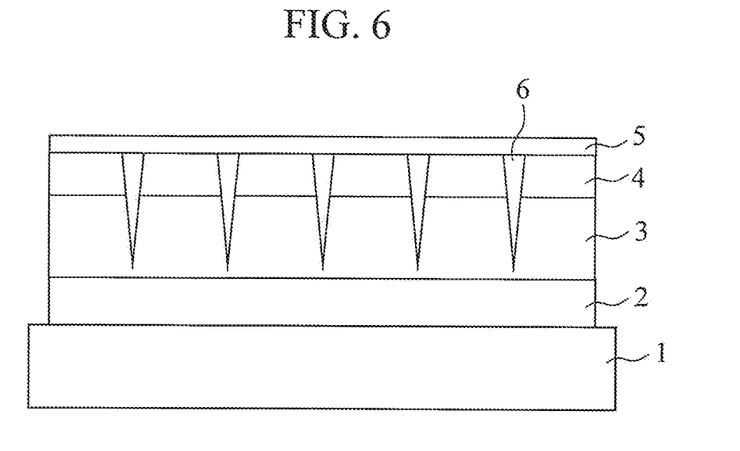
FIG. 6 schematically shows a cross-sectional structure of another exemplary magnetic recording medium according to the present invention.

FIG. 6 schematically shows a cross-sectional structure of an exemplary magnetic recording medium according to the present invention. The magnetic recording medium of the present example was manufactured by the same sputtering apparatus as Example 1. The following describes the manufacturing procedure of the magnetic recording medium.

A substrate 1 used was a glass substrate of 0.8 mm in thickness and 65 mm in diameter. Firstly, a primer layer 2 was formed on the substrate. That is, a Ni-37.5 at % Ta alloy film of 20 nm in thickness was formed as an adhesion layer, and then a Ni-6 at % W alloy layer of 4 nm in thickness and a Ru film of 12 nm in thickness were formed as orientation control layers. Subsequently, without heating of the substrate, a film as a recording layer 3 including Co-22 at % Pt-8 at % Cr alloy was formed to be a thickness of 10 nm, and then a film as a resonance layer 4 including Co-12 at % Pt-18 at % Cr alloy was formed to be a thickness of 4 nm. Then, a carbon film of 5 nm in thickness was formed as a protective layer on the resonance layer.

Next, a regular dot pattern made of imprint resist was formed using an imprinting apparatus. The total thickness of the resist was 50 nm, the dot pattern had height of 40 nm, and the residue of the resist was 10 nm. Subsequently, etching was performed in oxygen gas using a reactive ion etching apparatus, thus removing the resist residue and the protective film around the dots. Then, the height of the resist at dots reduced to 30 nm. Next, a part of the resonance layer and the recording layer around the dots was removed by ion beam etching using Ar gas. The etching duration was adjusted so that the recording layer was left to be 1.5 nm in thickness. Then, the imprint resist and the protective film remaining on the dots were removed by reactive ion etching using hydrogen. Further, carbon of 2.8 nm in thickness was formed as a protective layer 5. Finally, the medium was taken out from the chamber, and organic lubricant was applied to the surface to form a lubricant layer.

Structures of the recording layer 3 and the resonance layer 4 were observed with a transmission electron microscope. The observation showed that CoPtCr alloy magnetic grains (dots) were aligned regularly, and a part of the CoPtCr alloy magnetic grains of the thickness of 1.5 nm from the bottom face linked traversely between adjacent magnetic grains and a part of the CoPtCr alloy magnetic grains of the thickness of 12.5 nm from the top face was isolated physically by nonmagnetic grain boundaries 6. FIG. 6 schematically shows the cross-sectional structure of the magnetic recording medium of the present example that was observed with the transmission electron microscope.

Measuring compositional profile of the CoPtCr alloy magnetic grains in the depth direction by Auger electron spectroscopy, the part of 4 nm (resonance layer region) in depth from the top face of the magnetic grains included about 70 at % of Co, about 12 at % of Pt and about 18 at % of Cr, and the part of 4 nm to 14 nm (recording layer region) in depth from the top face of the magnetic grains included about 70 at % of Co, about 22 at % of Pt and about 8 at % of Cr.

Magnetic properties of the CoPtCr alloy were measured with a vibrating sample magnetometer. Saturation magnetization of both of the recording layer and the resonance layer was 750 emu/cm$^3$. The anisotropy field, the recording layer was 32 kOe and that of the resonance layer was 18 kOe.

Using a spin stand tester and a microwave assisted magnetic recording head, signals were written on the magnetic recording medium of the present example. At this time, the microwave assisted magnetic recording head was selected carefully so that the magnetic material of the resonance layer in the magnetic recording medium resonates with the high-frequency magnetic field generated from the microwave assisted magnetic recording head. Since the reproduced output of the written signals was sufficiently large, it was found that signals were recorded on the recording layer without problems. It was further found that information was written at recording density of 2 T bits per 1 square inch.

In the present example, a part of the resonance layer and the recording layer around the dots was removed by ion beam etching using Ar gas. Removing a part of the resonance layer and the recording layer around the dots by reactive ion etching also leads to a similar result. Alternatively, nonmagnetic ions may be implanted around the dots to non magnetize a part of the resonance layer and the recording layer around the dots. For instance, nitrogen ions, Kr ions or Cr ions may be implanted, whereby magnetically isolated magnetic grains may be produced. A result similar to the present example can be obtained in this case as well.

Comparative Example 3

A magnetic recording medium was manufactured by the procedure similar to Example 3. This comparative example was different from Example 3 only in that, instead of Co-12 at % Pt-18 at % Cr alloy, Co-10 at % Pt-15 at % Cr alloy and Co-8 at % Pt-12 at % Cr alloy were used for the resonance layer.

Although the minute structure of the recording layer and the resonance layer was exactly the same as Example 3, saturation magnetization and anisotropy field of the CoPtCr alloy magnetic grains were different from Example 3. That is, the saturation magnetization of the recording layer was 700 emu/cm$^3$, and that of the resonance layer was about 810 emu/cm$^3$. The anisotropy field of the recording layer was 65 kOe and that of the resonance layer was 20 kOe.

Using a spin stand tester and a microwave assisted magnetic recording head, signals were written on the magnetic recording media of this comparative example. Then, no reproduced output of the signals was obtained from both of the magnetic recording media. It was found that information could not be written on the recording layer.

When saturation magnetization is different between the magnetic material of the resonance layer and the magnetic material of the recording layer, the medium becomes relatively stable in the state where the orientation of the magnetization is not aligned between the resonance layer and the recording layer. Thus, the effect of assisting magnetization switching of magnetic grains in the recording layer by the resonance layer probably decreases. It is desirable that saturation magnetization is as equal as possible between the magnetic material of the resonance layer and the magnetic material of the recording layer, and a difference therebetween of 5% or more actually leads to a noticeable influence therefrom.

Example 4

A magnetic recording medium was manufactured by the procedure similar to Example 3. This example was different only in the CoPtCr alloy composition of the recording layer and the CoPtCr alloy composition of the resonance layer. Ten magnetic recording media were manufactured having fixed Co concentration at 65 at % while setting Pt concentration variously. Measuring the CoPtCr alloy composition of the recording layer and the resonance layer of the thus manufactured magnetic recording media by Auger electron spectroscopy, they showed values substantially as designed.

Structures of the recording layer and the resonance layer were observed with a transmission electron microscope. The observation showed that all of the magnetic recording media of the present example had the same structure as Example 3. That is, the CoPtCr alloy magnetic grains linked between adjacent magnetic grains at the lower part of the recording layer and were isolated at the upper part of the recording layer and the resonance layer.

Magnetic properties of the CoPtCr alloy were measured with a vibrating sample magnetometer. Saturation magnetization was about 680 emu/cm$^3$ for the recording layers and the resonance layers of all magnetic recording media. The anisotropy field of each magnetic recording medium showed a different value.

Using a spin stand tester and a microwave assisted magnetic recording head, signals were written on the magnetic recording medium of the present example. At this time, the microwave assisted magnetic recording head was selected carefully so that the magnetic material of the resonance layer in the magnetic recording medium resonates with the high-frequency magnetic field generated from the microwave assisted magnetic recording head. Since the reproduced output of the written signals was sufficiently large, it was found that signals were recorded on the recording layer without problems. It was further found that information was written at recording density of 2 T bits per 1 square inch.

Figure 7:
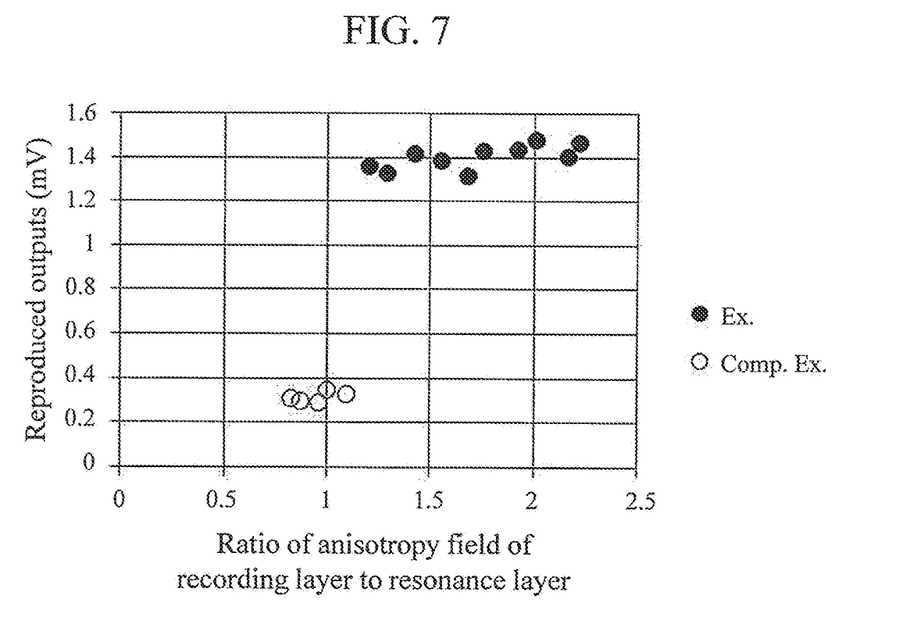
FIG. 7 is a graph showing the relationship between the ratio of the anisotropy field of the recording layer to the anisotropy field of the resonance layer and the reproduced outputs of signals.

FIG. 7 is a graph where the reproduced outputs of signals are plotted with reference to the ratio of the anisotropy field of the recording layer to the anisotropy field of the resonance layer. Filled circles show properties of the magnetic recording media of the present example. This result shows that a magnetic recording medium having anisotropy field of the magnetic material of the recording layer 1.2 times or more anisotropy field of the magnetic material of the resonance layer generates sufficiently large reproduced output of written signals, meaning a sufficient effect of microwave assist. Media as comparative examples in the drawing will be described later.

Figure 8:
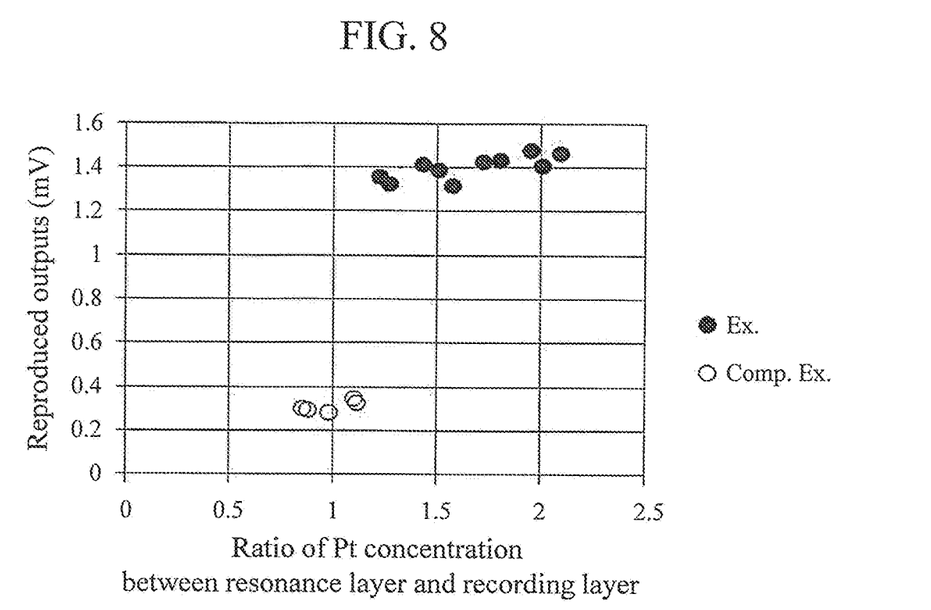
FIG. 8 is a graph where the reproduced outputs of signals are plotted with reference to the Pt concentration of CoPtCr alloy.

FIG. 8 is a graph where the reproduced outputs of signals are plotted with reference to the Pt concentration of CoPtCr alloy. Filled circles show the magnetic recording media of the present example. The Pt concentration of CoPtCr alloy is shown by setting the ratio between the Pt concentration of the recording layer and the Pt concentration of the resonance layer as a parameter and organizing the results. This parameter is created based on the fact that, when the Co concentration of the CoPtCr alloy is constant, the Pt concentration is substantially proportional to the anisotropy field. The result shows that sufficiently large reproduced output of written signals, meaning a sufficient effect of microwave assist can be obtained when the Pt concentration of the CoPtCr alloy of the recording layer is 1.2 times or more the Pt concentration of the CoPtCr alloy of the resonance layer. Media as comparative examples in the drawing will be described later.

A similar effect of microwave assist was obtained from the CoPtCr alloy of the present example, to which additive elements such as B, Si, Ti, Ni, Cu or Ru was added, as long as the recording layer and the resonance layer had substantially the same saturation magnetization and the anisotropy field of the magnetic material of the recording layer was 1.2 times or more the anisotropy field of the magnetic material of the resonance layer, thus enabling high-density recording.

Comparative Example 4

A magnetic recording medium was manufactured by the procedure similar to Example 4. This comparative example was different from Example 4 only in the CoPtCr alloy composition of the recording layer and the resonance layer. Five magnetic recording media were manufactured having fixed Co concentration at 65 at % while setting Pt concentration variously. Structures of the recording layer and the resonance layer and their saturation magnetization were exactly the same as those of Example 4.

Blank circles of FIG. 7 show properties of the magnetic recording media of this comparative example about the ratio of anisotropy field. This result shows that a magnetic recording medium having anisotropy field of the magnetic material of the recording layer less than 1.2 times the anisotropy field of the magnetic material of the resonance layer shows difficulty in writing due to insufficient effect of microwave assist, thus reducing reproduced output greatly. In the case where the anisotropy field of the magnetic material of the recording layer is close, to the anisotropy field of the magnetic material of the resonance layer, although magnetic material of the recording layer starts resonance by high-frequency magnetic field generated from the microwave assisted magnetic recording head, rotation of spins does not become large enough due to the exchange coupling with the surrounding magnetic grains, so that magnetization switching does not occur probably. A magnetic layer generating resonance is required to be magnetically isolated from the surrounding magnetic gains.

Blank circles of FIG. 8 show properties of the magnetic recording media of this comparative example about the ratio of Pt concentration. This result shows that a magnetic recording medium having the Pt concentration of the CoPtCr alloy of the recording layer less than 1.2 times the Pt concentration of the CoPtCr alloy of the resonance layer shows difficulty in writing due to insufficient effect of microwave assist, thus reducing reproduced output greatly.

Example 5

Figure 9:
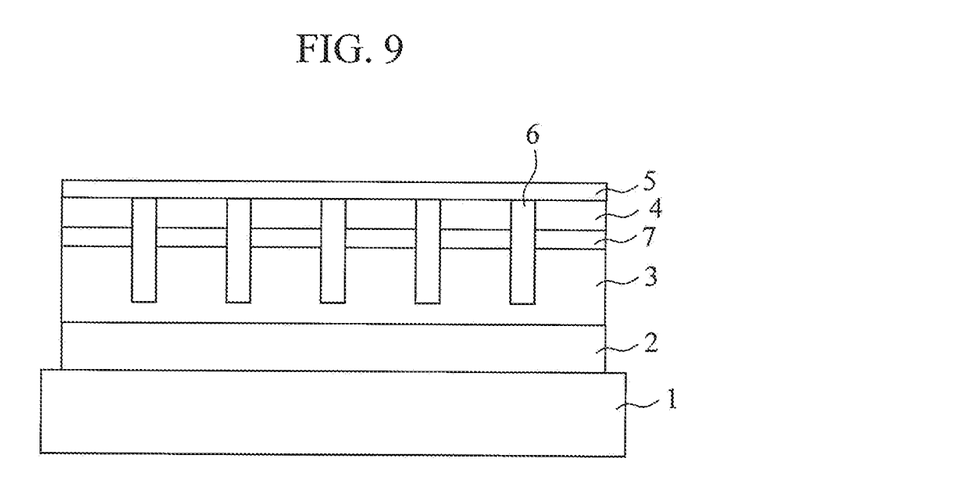
FIG. 9 schematically shows a cross-sectional structure of still another exemplary magnetic recording medium according to the present invention.

FIG. 9 schematically shows a cross-sectional structure of an exemplary magnetic recording medium according to the present invention.

The magnetic recording medium of the present example was manufactured by the procedure similar to that of Example 3 except that an exchange coupling adjustment layer 7 was formed between the recording layer 3 and the resonance layer 4. The effect of assisting magnetization switching of the recording layer 3 by the resonance layer 4 can be enhanced by suitably selecting the magnitude of the exchange coupling between the recording layer 3 and the resonance layer 4. Too much reduced exchange coupling, however, weakens the assist effect. Since the exchange coupling action originally has a function of aligning the orientation of magnetization, reduced action means that the device becomes relatively stable in the state where the orientation of the magnetization is not aligned between the resonance layer 4 and the recording layer 3. Since such a not-aligned state of the magnetization orientation tends to reduce the ratio (Mr/Ms) of the remanent magnetization to the saturation magnetization of the magnetic recording medium, the minimum value of the exchange coupling between the recording layer and the resonance layer is found by simulation using this tendency as an index.

Figure 10:
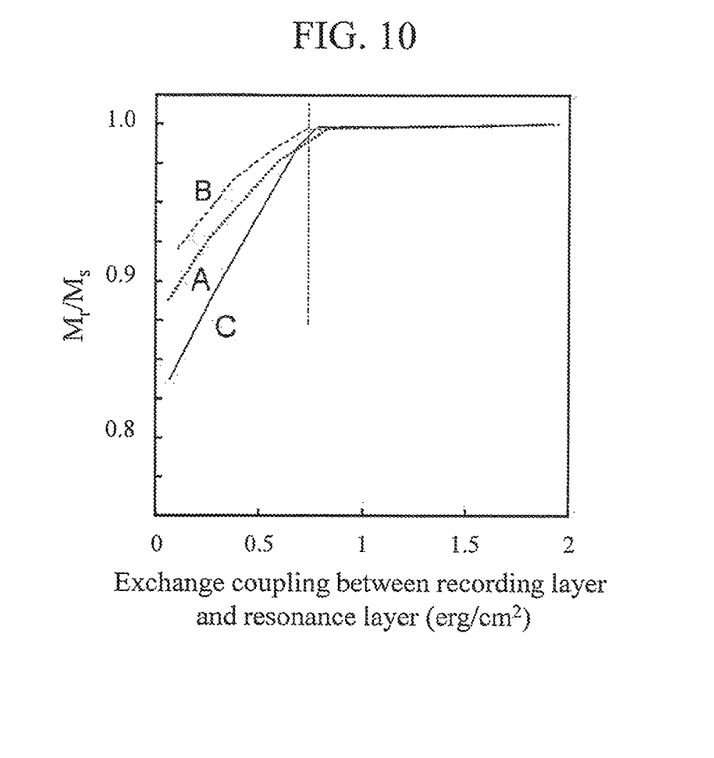
FIG. 10 shows the relationship between the magnitude of exchange coupling of the recording layer with the resonance layer and Mr/Ms.

FIG. 10 shows the result. Calculation was performed by setting the anisotropy field of the recording layer at 30 kOe, the anisotropy field of the resonance layer at 17 kOe and the exchange coupling between magnetic grains at 0.4 erg/cm². Calculation was performed under three conditions including A, B and C using the frequency and the intensity of high-frequency magnetic field applied from the magnetic head to the magnetic recording medium as parameters. In condition A, the frequency was 25 GHz and the intensity was 200 Oe. In condition B, the frequency was 20 GHz and the intensity was 200 Oe. In condition C, the frequency was 25 GHz and the intensity was 400 Oe. The exchange coupling between the recording layer and the resonance layer less than 0.75 erg/cm² caused a reduction of the ratio (Mr/Ms) of the remanent magnetization to the saturation magnetization, meaning instable magnetization of the resonance layer. This result shows that, in the configuration including an exchange coupling adjustment layer between the recording layer and the resonance layer, the exchange coupling between the recording layer and the resonance layer of 0.75 erg/cm² or more leads to the effect of microwave assisting, thus enabling high-density recording.

Example 6

Figure 11:
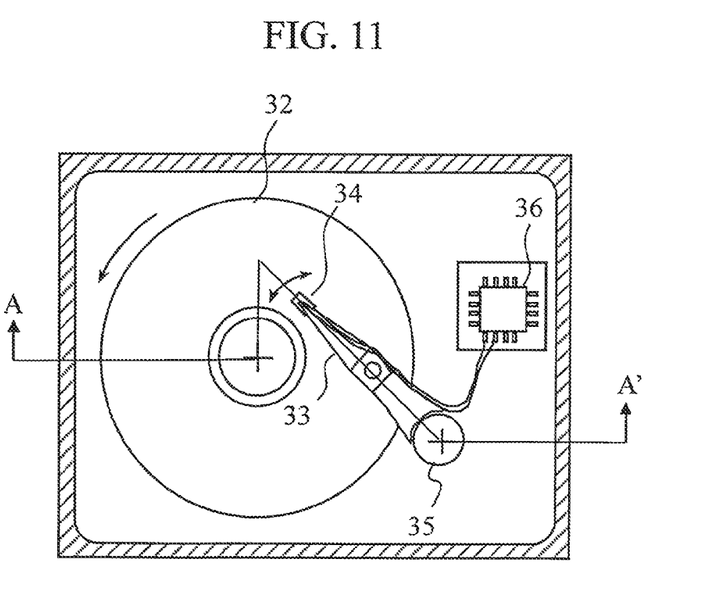
FIG. 11 is a schematic plan view of an information recording apparatus.
Figure 12:
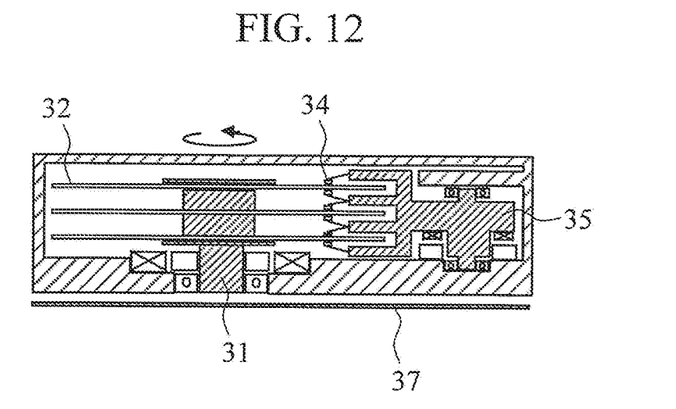
FIG. 12 is a schematic cross-sectional view taken along line A-A' of FIG. 11.

Using the microwave assisted magnetic recording medium described in the above examples and a microwave assisted magnetic recording head, an information recording apparatus was assembled. FIG. 11 is a schematic plan view of the information recording apparatus of the present example, and FIG. 12 is a schematic cross-sectional view taken along line A-A' of FIG. 11.

This magnetic recording apparatus is configured to record and reproduce magnetized signals on/from a predetermined position on a magnetic disk (magnetic recording medium) 32 rotated by a motor 31 using a magnetic head mounted at a slider 34 fixed at a forward end of a suspension arm 33. Driving of a rotary actuator 35 enables the position (track) of the magnetic head in the radius direction of the magnetic disk to be selected. Recording signals on the magnetic head and reading signals from the magnetic head are processed by signal processing circuits 36, 37. The magnetic head is provided with a high-frequency magnetic field oscillation element, a magnetic pole that generates recording magnetic field and a magnetic reproduction element that reads magnetic information.

Figure 13:
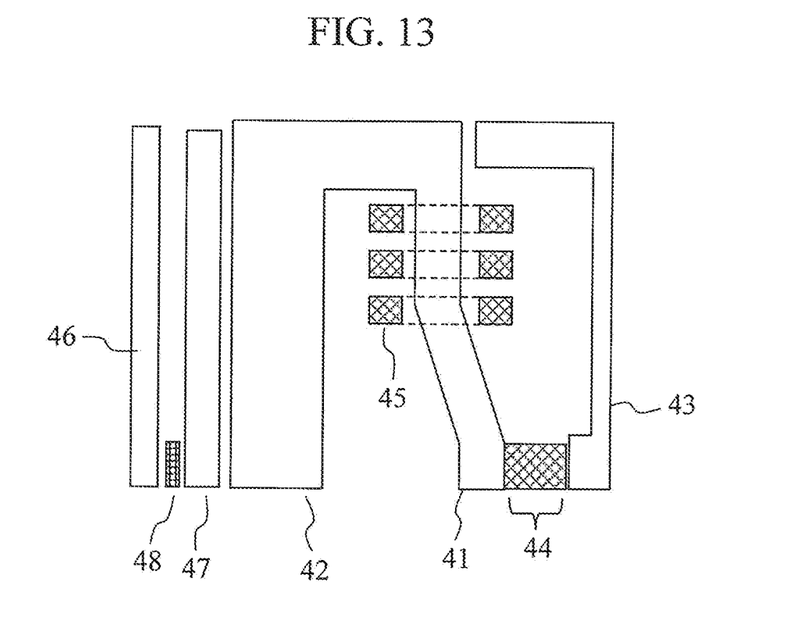
FIG. 13 is a schematic view of an exemplary microwave assisted magnetic recording head.

FIG. 13 is an enlarged schematic view of a cross-section of an exemplary microwave assisted magnetic recording head provided with a well-known spin torque oscillator as a high-frequency magnetic field oscillation element. The magnetic head includes a recording head section and a reproduction head section. The recording head section includes an auxiliary pole 42, a spin torque oscillator 44 arranged between a main pole 41 and an opposing pole 43, a coil 45 that excites the main pole and the like. Recording magnetic field is generated from the main pole 41. The reproduction head section includes a reproduction sensor 48 arranged between a lower shield 46 and an upper shield 47 and the like. Although not shown in the figure, excitation current of the coil, driving current of the reproduction sensor, and current to be applied to the high-frequency magnetic field oscillating element are supplied from a current supply terminal provided at each element.

As shown in FIG. 13, the opposing pole 43 extends toward the main pole 41 in an upper part in the element height direction and configures a magnetic circuit in conjunction with the main pole. However, the opposing pole is electrically insulated in the upper part in the element height direction. As a result, a series electric circuit is formed from the main pole 41 to the opposing pole 43 via the spin torque oscillator 44. Thus, it is possible to feed electric current necessary for spin torque oscillation to the spin torque oscillator 44 by connecting electrodes to the main pole 41 and the opposing pole 43.

The microwave assisted magnetic recording head of the present examples are selected so that the magnetic material of the resonance layer in the magnetic recording medium resonates with the high-frequency magnetic field generated from the microwave assisted magnetic recording head. It was found that this information recording apparatus enables information to be written at recording density of 2 T bits per 1 square inch.

The present invention is not limited to the above-described examples, and may include various modification examples. For instance, the examples described above in detail are for explanatory convenience, entire of which is not always necessary for the present invention. A part of one example may be replaced with the configuration of another example, or the configuration of one example may be combined with the configuration of another example. The configuration of each example may additionally include another configuration, or a part of the configuration may be deleted or replaced.

What is claimed is:

1. A magnetic recording medium, comprising:
a magnetic layer disposed on a nonmagnetic substrate, the magnetic layer including magnetic grains made up of a first recording layer and a second recording layer, the first recording layer and the second recording layer having different magnitude of anisotropy field,
wherein
the first recording layer is disposed closer to the substrate than the second recording layer,
a magnetic material of the first recording layer has anisotropy field 1.2 times or more anisotropy field of a magnetic material of the second recording layer,
the magnetic material of the first recording layer has saturation magnetization substantially equal to saturation magnetization of the magnetic material of the second recording layer,
the magnetic grains at the second recording layer are separated from surrounding magnetic grains at the second recording layer by a nonmagnetic material, and
the magnetic grains at the first recording layer are partially separated from surrounding magnetic grains at the first recording layer by the nonmagnetic material.

2. The magnetic recording medium according to claim 1, wherein
the magnetic grains at the first recording layer are coupled with surrounding magnetic grains at the first recording layer on a side of the substrate.

3. The magnetic recording medium according to claim 1, further comprising an exchange coupling adjustment layer between the first recording layer and the second recording layer, wherein
exchange coupling between the first recording layer and the second recording layer is 0.75 erg/cm$^2$ or more.

4. The magnetic recording medium according to claim 1, wherein
the anisotropy field of the second recording layer has magnitude of resonating with high-frequency magnetic field generated from a recording head for recording on the magnetic recording medium.

5. The magnetic recording medium according to any one of claims 1 to 4, wherein
the magnetic grains are aligned regularly.

6. A magnetic recording medium, comprising:
a magnetic layer disposed on a nonmagnetic substrate, the magnetic layer including an aggregation of magnetic grains including FePt alloy or CoPt alloy as a main component, the magnetic grains being made up of a first recording layer and a second recording layer, the first recording layer and the second recording layer having different magnitude of anisotropy field,
wherein
the first recording layer is disposed closer to the substrate than the second recording layer,
the alloy of the first recording layer has a substantially same composition as the alloy of the second recording layer,
a degree of order S1 of the alloy of the first recording layer and a degree of order S2 of the alloy of the second recording layer hold the relationship of $(S1-0.4)/(S2-0.4) \geq 1.2$,
the magnetic grains at the second recording layer are separated from surrounding magnetic grains at the second recording layer by a nonmagnetic material, and
the magnetic grains at the first recording layer are partially separated from surrounding magnetic grains at the first recording layer by the nonmagnetic material.

7. A magnetic recording medium, comprising:
a magnetic layer disposed on a nonmagnetic substrate, the magnetic layer including an aggregation of magnetic grains including CoPtCr alloy as a main component, the magnetic grains being made up of a first recording layer and a second recording layer, the first recording layer and the second recording layer having different magnitude of anisotropy field,
wherein
the first recording layer is disposed closer to the substrate than the second recording layer,
the CoPtCr alloy of the first recording layer has a Co concentration that is substantially same as a Co concentration of the CoPtCr alloy of the second recording layer,
the CoPtCr alloy of the first recording layer has a Pt concentration 1.2 times or more a Pt concentration of the CoPtCr alloy of the second recording layer,
the magnetic grains at the second recording layer are separated from surrounding magnetic grains at the second recording layer by a nonmagnetic material, and
the magnetic grains at the first recording layer are partially separated from surrounding magnetic grains at the first recording layer by the nonmagnetic material.

8. The magnetic recording medium according to claim 6 or 7, wherein
the magnetic grains at the first recording layer are coupled with surrounding magnetic grains at the first recording layer on a side of the substrate.

9. The magnetic recording medium according to claim 6 or 7, further comprising an exchange coupling adjustment layer between the first recording layer and the second recording layer, wherein
exchange coupling between the first recording layer and the second recording layer is 0.75 erg/cm$^2$ or more.

10. The magnetic recording medium according to claim 6 or 7, wherein
the anisotropy field of the second recording layer has magnitude of resonating with high-frequency magnetic field generated from a recording head for recording on the magnetic recording medium.

11. An information recording apparatus, comprising:
a magnetic recording medium;
a medium driving unit that drives the magnetic recording medium; and
a magnetic head performing a recording operation and a reproduction operation of information with respect to the magnetic recording medium, the magnetic head including a magnetic pole generating recording magnetic field and a high-frequency magnetic field oscillation element that generates high-frequency magnetic field, wherein
the magnetic recording medium comprises a magnetic layer disposed on a nonmagnetic substrate, the magnetic layer including magnetic grains made up of a first recording layer and a second recording layer, the first recording layer and the second recording layer having different magnitude of anisotropy field, wherein the first recording layer is disposed closer to the substrate than the second recording layer, the anisotropy field of the magnetic material of the second recording layer has magnitude of resonating with high-frequency magnetic field generated from a recording head for recording on the magnetic recording medium, a magnetic material of the first recording layer has anisotropy field 1.2 times or more anisotropy field of a magnetic material of the second recording layer, the magnetic material of the first recording layer has saturation magnetization substantially equal to saturation magnetization of the magnetic material of the second recording layer, the magnetic grains at the second recording layer are separated from surrounding magnetic grains at the second recording layer by a nonmagnetic material, and the magnetic grains at the first recording layer are partially separated from surrounding magnetic grains at the first recording layer by the nonmagnetic material.

12. The information recording apparatus according to claim 11, wherein
the magnetic grains at the first recording layer are coupled with surrounding magnetic grains at the first recording layer on a side of the substrate.

13. The information recording apparatus according to claim 11, further comprising an exchange coupling adjustment layer between the first recording layer and the second recording layer, wherein
exchange coupling between the first recording layer and the second recording layer is 0.75 erg/cm$^2$ or more.

14. The information recording apparatus according to claim 11, wherein
the magnetic grains are aligned regularly.

* * * * *